(No Model.)

E. H. DUNHAM.
ORNAMENTAL CHAIN.

No. 364,582.      Patented June 7, 1887.

Witnesses.
John S. Lynch
Peter Savage

Inventor:
Edward H. Dunham
per S. Scholfield.
Attorney

UNITED STATES PATENT OFFICE.

EDWARD H. DUNHAM, OF PROVIDENCE, RHODE ISLAND, ASSIGNOR TO SMITH DUNHAM & CO., OF SAME PLACE.

ORNAMENTAL CHAIN.

SPECIFICATION forming part of Letters Patent No. 364,582, dated June 7, 1887.

Application filed November 10, 1884. Serial No. 147,578. (No model.)

*To all whom it may concern:*

Be it known that I, EDWARD H. DUNHAM, of Providence, in the State of Rhode Island, have invented an Improvement in Ornamental Chains, of which the following is a specification.

The nature of my invention consists in the improved combination of links having an interior hollowed surface and alternate connecting hook-links, whereby a strong and durable ornamental chain may be formed by means of automatic machinery.

Figure 1:
Figure 2:
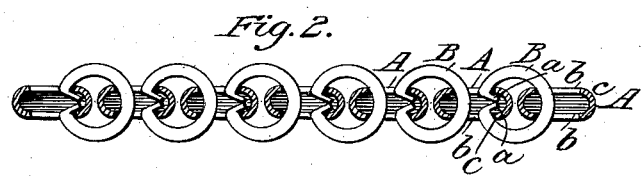
Figure 3:

Figure 1 is an elevation of the chain, showing the hollow links in side view and the intermediate connecting-links in edge view. Fig. 2 is a longitudinal section of the chain taken in the line *x x* of Fig. 1. Fig. 3 is a plan view of the connecting-link, showing the hook form of its adjacent ends.

In the accompanying drawings, A A are hollow links, similar to those ordinarily employed in the manufacture of what is known to the trade as "roller-chain," the concave or hollowed form of the interior surface, *c*, of the link being shown in the section, Fig. 2. The adjacent ends of the connecting-link B are bent or upset to form short adjacent hooks *a a*, adapted to hook over the opposite edges, *b b*, of the hollow link A, and thus form a chain composed of alternating hollow and hook-jointed links, as shown in the drawings.

In a chain as ordinarily formed of interiorly concaved or hollow links, made either in a continuous ring or with a soldered joint and an annular intermediate connecting-link, a comparatively slight pull upon the ends of the chain will suffice to cause the spreading of the connecting-links and the consequent separation of the chain; but when the ends of the connecting-links are made in hook-form the former spreading tendency will be obviated and the strength of the chain to resist forcible separation by endwise tension will be greatly increased, so that a practically perfect chain of this class can be thus manufactured without the employment of solder. The connecting-links B may be either cut out of sheet metal or made of wire in any desirable form of cross-section, a link, B, of contrasting ornamental form being shown in the drawings.

The close proximity of the links B B to each other within a single hollow-formed link, A, serves to prevent the hook ends *a a* of the inclosed connecting-links from passing out of the internal hollow, *c*.

I claim as my invention—

An ornamental chain composed of the annular links having an interior concave or hollowed surface, and the intermediate connecting-links passing through the central opening of one of the annular links and inwardly hooked to the interior edges of the adjacent annular link of the chain, substantially as described.

EDWARD H. DUNHAM.

Witnesses:
 SOCRATES SCHOLFIELD,
 H. DEWITT SMITH.